United States Patent
Hou et al.

(10) Patent No.: US 8,718,330 B2
(45) Date of Patent: May 6, 2014

(54) DISTANCE ACQUISITION DEVICE, LENS CORRECTING SYSTEM AND METHOD APPLYING THE DISTANCE ACQUISITION DEVICE

(75) Inventors: Li-Cong Hou, Suzhou Industrial Park (CN); Yang Li, Suzhou Industrial Park (CN)

(73) Assignee: Realtek Semiconductor Corp., Hsinchu (TW)

( * ) Notice: Subject to any disclaimer, the term of this patent is extended or adjusted under 35 U.S.C. 154(b) by 385 days.

(21) Appl. No.: 13/051,359

(22) Filed: Mar. 18, 2011

(65) Prior Publication Data
US 2011/0228141 A1 Sep. 22, 2011

(30) Foreign Application Priority Data
Mar. 19, 2010 (CN) .......................... 2010 1 0131511

(51) Int. Cl.
*G06K 9/00* (2006.01)
*G06K 9/40* (2006.01)
(52) U.S. Cl.
USPC ............................ 382/106; 382/274; 382/275
(58) Field of Classification Search
USPC ........................................ 382/106, 274–275
See application file for complete search history.

(56) References Cited

U.S. PATENT DOCUMENTS

| 2006/0146422 A1* | 7/2006 | Koike ........................... 359/742 |
| 2006/0204125 A1* | 9/2006 | Kempf et al. ................. 382/274 |
| 2009/0046171 A1* | 2/2009 | Kogan et al. ............... 348/223.1 |
| 2011/0090371 A1* | 4/2011 | Cote et al. .................... 348/237 |

* cited by examiner

*Primary Examiner* — Matthew Bella
*Assistant Examiner* — Weiwen Yang
(74) *Attorney, Agent, or Firm* — McClure, Qualey & Rodack, LLP

(57) ABSTRACT

A distance acquisition device is for acquiring a first rounded distance from a reference point to a basis point, and for subsequently acquiring a second rounded distance from an adjacent point to the basis point. The reference, adjacent, and basis points are disposed on a plane. The adjacent point is adjacent to the reference point. The distance acquisition device includes: a reference distance acquisition unit for acquiring a precise distance from the reference point to the basis point, and for subsequently performing rounding upon the precise distance so as to obtain the first rounded distance; a reference error acquisition unit for obtaining a first reference error corresponding to a difference between the precise distance and the first rounded distance; and a distance estimating unit for setting the second rounded distance based on the first rounded distance and the first reference error.

21 Claims, 10 Drawing Sheets

DISTANCE ACQUISITION DEVICE, LENS CORRECTING SYSTEM AND METHOD APPLYING THE DISTANCE ACQUISITION DEVICE

CROSS-REFERENCE TO RELATED APPLICATION

This application claims priority of Chinese Application No. 201010131511-9 filed on Mar. 19, 2010.

BACKGROUND OF THE INVENTION

1. Field of the Invention

The present invention relates to a distance acquisition device, more particularly to a distance acquisition device, and a lens correcting system and method applying the distance acquisition device.

2. Description of the Related Art

Generally, in multimedia applications, images are captured using a lens and are subsequently subjected to processing by electronic circuits. Such applications may include portable digital cameras, web cameras, and mobile phones with image-capturing capability.

Non-planar lenses are often used for capturing images with required viewing angles. However, such lenses generally exhibit non-uniform optical characteristics (e.g., optical vignetting) at various relative positions thereof, which are unacceptable in certain high-quality applications. Conventional techniques for correcting such non-uniform optical characteristics generally include the process of adjusting brightness of each pixel of an image based on a distance between the pixel and the center of the image.

Specifically, in a Cartesian coordinate system, the distance between any two points may be obtained through the following equation:

$$d=\sqrt{(x_1-x_0)^2+(y_1-y_0)^2}$$

wherein $(x_0, y_0)$ represents the coordinates of one of the points, $(x_1, y_1)$ represents the coordinates of the other of the points, and d represents the distance between the points.

Hardware implementation of such a mathematical equation requires three adders, two multipliers, and a square root extractor. However, obtaining a distance for each pixel of the image from the center of the image through the hardware implementation of the aforesaid equation will result in high circuit costs.

SUMMARY OF THE INVENTION

Therefore, an object of the present invention is to provide a distance acquisition device capable of simplifying computational processes and reducing circuit costs.

Another object of the present invention is to provide a lens correcting system and method that apply the aforesaid distance acquisition device for correcting a captured image such that the captured image exhibits relatively uniform brightness.

According to a first aspect of the invention, there is provided a distance acquisition device suitable for acquiring a first rounded distance from a reference point to a basis point, and for subsequently acquiring a second rounded distance from an adjacent point to the basis point. The reference, adjacent, and basis points are disposed on a plane, with the adjacent point being a point adjacent to the reference point.

The distance acquisition device comprises a reference distance acquisition unit, a reference error acquisition unit, and a distance estimating unit.

The reference distance acquisition unit is configured to acquire a precise distance from the reference point to the basis point, and to subsequently perform rounding upon the precise distance so as to obtain the first rounded distance.

The reference error acquisition unit is configured to obtain a first reference error corresponding to a difference between the precise distance and the first rounded distance.

The distance estimating unit is configured to set the second rounded distance based on the first rounded distance and the first reference error.

According to a second aspect of the invention, there is provided a lens correcting system adapted to receive a captured image captured through a lens and including a plurality of pixels, one of which being a basis pixel and another of which being a reference pixel. The lens correcting system comprises a distance acquisition device and a correcting device.

The distance acquisition device includes: a reference distance acquisition unit configured to acquire a precise distance from the reference pixel to the basis pixel, and to subsequently perform rounding upon the precise distance so as to obtain a first rounded distance; a reference error acquisition unit configured to obtain a first reference error corresponding to a difference between the precise distance and the first rounded distance; and a distance estimating unit configured to set a second rounded distance for an adjacent pixel adjacent to the reference pixel based on the first rounded distance and the first reference error.

The correcting device is configured to perform adjustment upon the reference pixel and the adjacent pixel based on correcting factors that correspond to the first and second rounded distances acquired by the distance acquisition device.

According to a third aspect of the invention, there is provided a lens correcting method for processing a captured image captured through a lens and including a plurality of pixels, one of which being a basis pixel and another of which being a reference pixel, that may be arranged in a matrix. The lens correcting method comprises:

a) acquiring a precise distance from the reference pixel to the basis pixel, and performing rounding upon the precise distance so as to obtain a first rounded distance;

b) obtaining a first reference error corresponding to a difference between the precise distance and the first rounded distance;

c) setting a second rounded distance for an adjacent pixel adjacent to the reference pixel based on the first rounded distance and the first reference error; and d) performing adjustment upon the reference pixel and the adjacent pixel based on correcting factors that correspond to the first and second rounded distances acquired by said distance acquisition device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
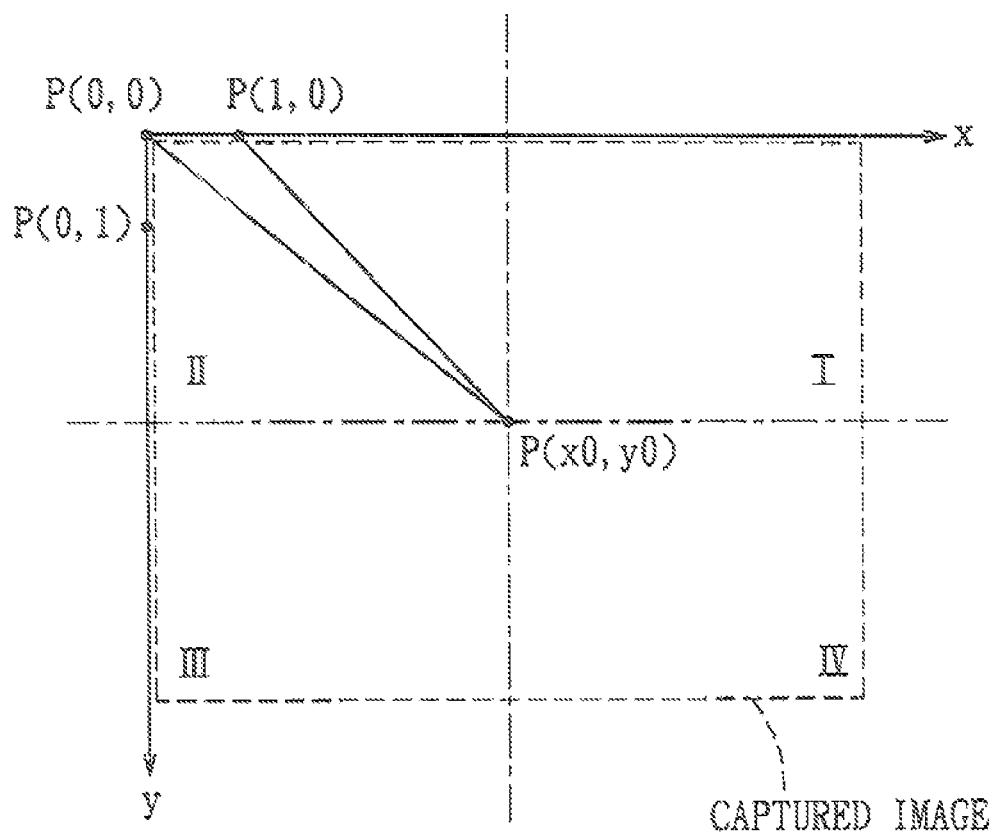
FIG. 1 is a schematic diagram to illustrate distances from a plurality of pixels of a captured image to a pixel at the center of the image.

Before the present invention is described in greater detail, it should be noted that like elements are denoted, by the same reference numerals throughout the disclosure.

The first preferred embodiment of a lens correcting system according to the present invention is applicable to correct a captured image that was captured through a lens and that includes a plurality of pixels arranged in a matrix.

Referring to FIG. 1, each of the pixels may be mapped with a corresponding point in a two-dimensional Cartesian coordinate system such that each of the pixels may be associated with unique (x, y) coordinates. The pixel at the top-left corner of the captured image, which is marked by P(0,0), serves as the origin of the Cartesian coordinate system and as a reference pixel from which the lens correcting system starts processing remaining pixels of the captured image. The pixel at the center of the captured image, which is marked by P(x0, y0), may be referred to as the basis pixel. "x0" and "y0" of P(x0,y0) are both greater than zero. Furthermore, horizontal and vertical extending lines extending respectively through P(x0,y0) may divide the captured image into first, second, third, and fourth quadrants (I, II, III, IV).

Figure 2:
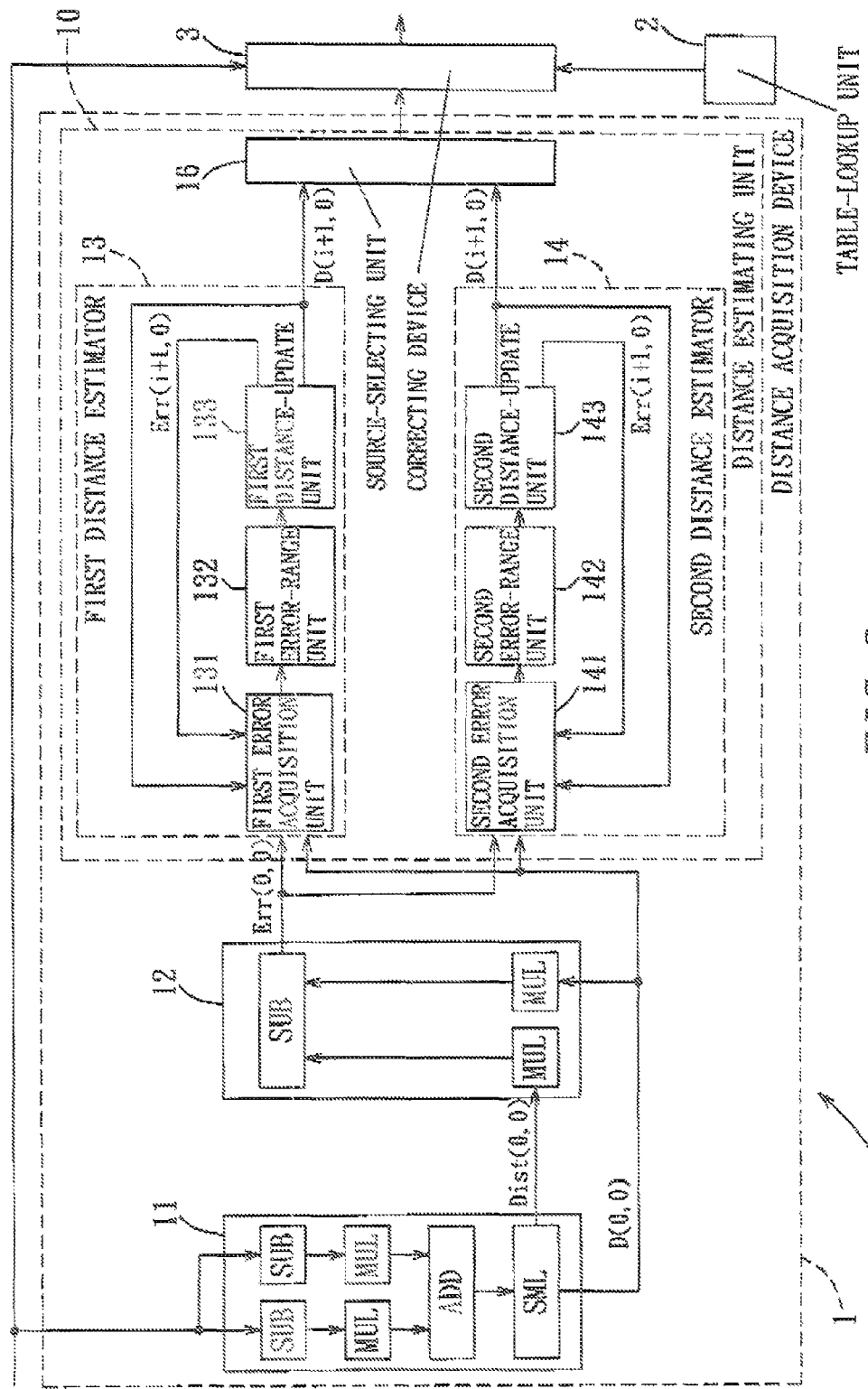
FIG. 2 is a block diagram to illustrate the first preferred embodiment of a lens correcting system according to the present invention.

Referring to FIG. 2, the lens correcting system 100 of this embodiment comprises a distance acquisition device 1, a table-lookup unit 2, and a correcting device 3. The distance acquisition device 1 is configured to acquire a distance between one of the pixels in the image and P(x0,y0), and to, based on the distance thus acquired, set distances for other pixels of the captured image to P(x0, y0). The table-lookup unit 2 records a relationship between each possible distance and a corresponding correcting factor. The correcting device 3 is configured to, for each pixel of the captured image, adjust brightness of the pixel based on the distance acquired therefor with reference to the relationships recorded in the table-lookup unit 2. The captured image, after the pixels of which are subjected to brightness adjustment by the correcting device 3, will exhibit relatively uniform distribution of brightness. Conforming to a generic logic circuit, computational results of distance acquisitions performed by the distance acquisition device 1 may be rounded to integers, i.e., the acquired distances are approximated distances.

In this embodiment, the distance acquisition device 1 includes a reference distance acquisition unit 11, a reference error acquisition unit 12, and a distance estimating unit 10 that includes first and second distance estimators 13, 14. Operation of the distance acquisition device 1 will be described hereinafter with reference to the pixels P(i,0) in the first row of the first and second quadrants (I, II). It is to be noted that D(i,j) corresponds to a rounded distance between an arbitrary pixel P(i,j) and the basis pixel P(x0,y0), wherein "i" is an integer not smaller than zero and smaller than a width of the captured image, and "j" is an integer not smaller than zero and smaller than a height of the captured image.

Figure 3:
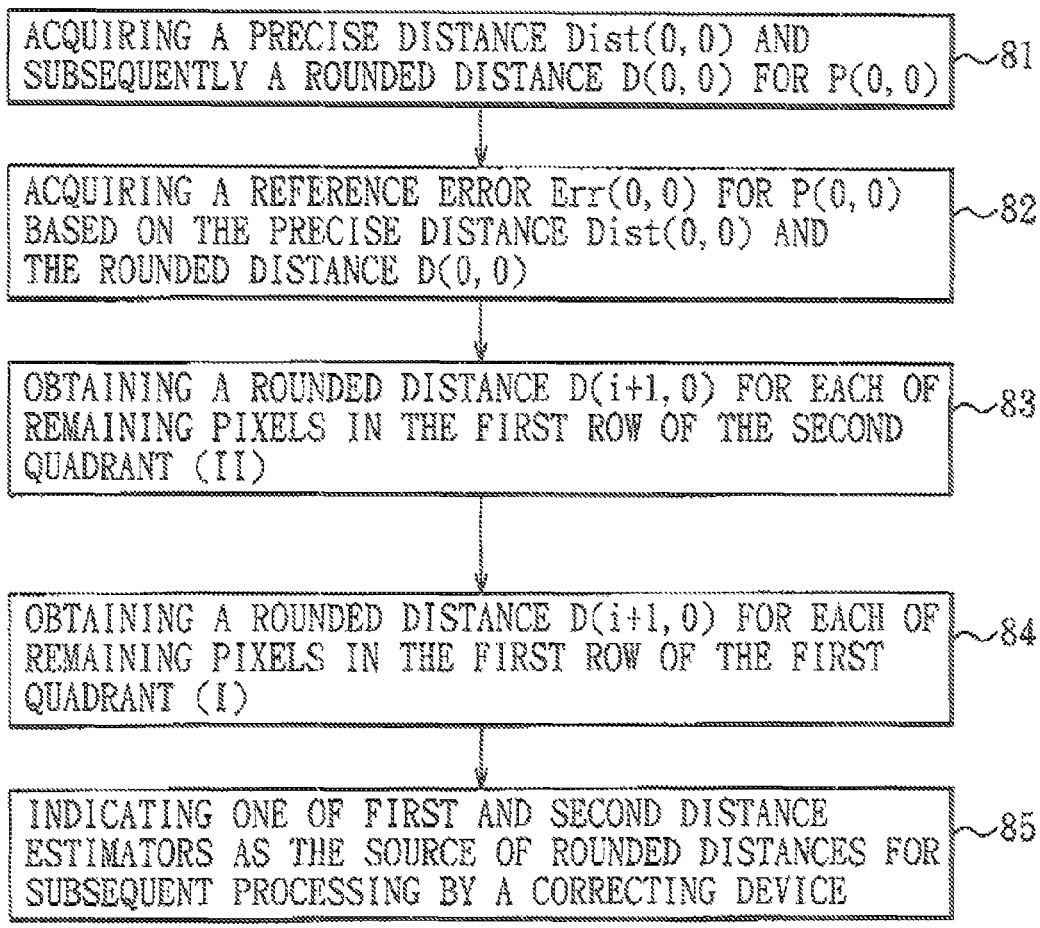
FIG. 3 is a flowchart to illustrate the first preferred embodiment of a lens correcting method according to the present invention.

With further reference to FIG. 3, the lens correcting system 100 of the first preferred embodiment is configured to perform the first preferred embodiment of a lens correcting method according to the present invention.

In step 81, the reference distance acquisition unit 11 is configured to acquire a precise distance Dist(0,0) and subsequently a rounded distance D(0,0) for P(0,0) based on Equation 1:

$$\text{Dist}(i,j) = \sqrt{(i-x0)^2 + (j-y0)^2} \qquad \text{(Equation 1)}$$

To implement Equation 1, the reference distance acquisition unit 11 includes:

two subtractors (SUB) for obtaining a difference between P(0,0) and P(x0,y0) along the x-axis, and a difference between P(0,0) and P(x0,y0) along the y-axis, respectively;

two multipliers (MUL) for obtaining a square value of the difference between P(0,0) and P(x0,y0) along the x-axis, and that of the difference between P(0,0) and P(x0,y0) along the y-axis, respectively;

an adder (ADD) for summing the square values obtained by the multipliers (MUL); and a square-root extractor (SML) for obtaining a square-root value of the sum of the square values obtained by the adder (ADD). The square-root value thus obtained serves as the precise distance Dist(0,0) between P(0,0) and P(x0,y0). The reference distance acquisition unit 11 is further configured to obtain the rounded distance D(0,0) by performing a rounding operation upon the precise distance Dist(0,0) for rounding to the nearest integer.

It is worth noting that a difference between the precise and rounded distances Dist(0,0), D(0,0) has a magnitude not greater than one. In this embodiment, for each pixel in the second quadrant (II), the reference distance acquisition unit 11 is configured to perform a round-down operation to the nearest integer so as to obtain the rounded distance D(i,j) of the pixel.

In step 82, the reference error acquisition unit 12 is configured to acquire a reference error Err(0,0) for P(0,0) by applying the precise and rounded distances Dist(0,0), D(0,0) to Equation 2:

$$\text{Err}(i,j) = D(i,j)^2 - \text{Dist}(i,j)^2 \qquad \text{(Equation 2)}$$

To implement Equation 2, the reference error acquisition unit 12 includes:

two multipliers (MUL) for obtaining a square value of the precise distance Dist(0,0) and that of the rounded distance D(0,0), respectively; and a subtractor (SUB) for obtaining a difference between the square values obtained by the multipliers (MUL), the difference between the square values serving as the reference error Err(0,0).

Figure 4:
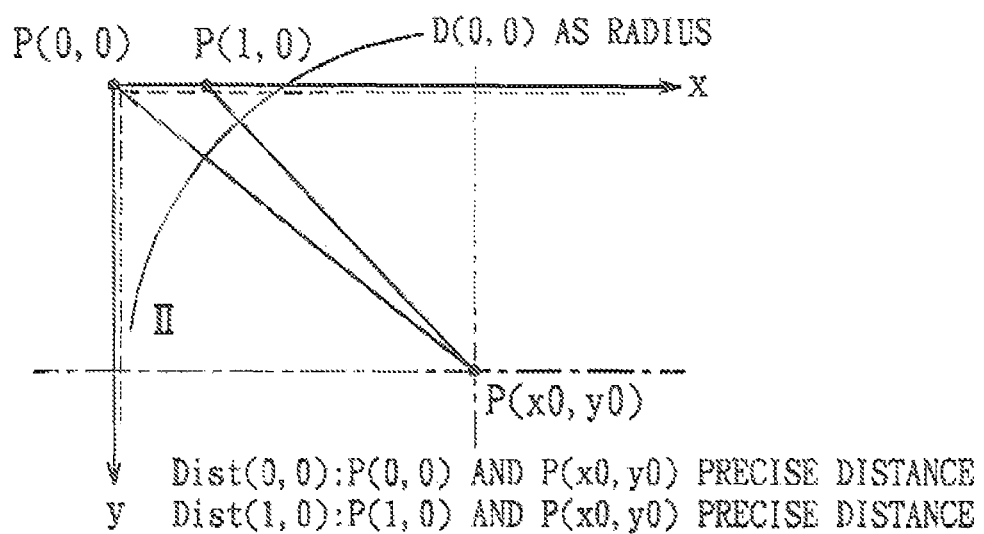
FIG. 4 is a schematic diagram to illustrate two adjacent pixels in a second quadrant falling outside a circle centered at the center of the image.

Referring to FIG. 4, if the rounded distance D(0,0) serves as the radius of a circle that is centered on the basis pixel P(x0,y0), P(0,0) will not fall within the circle and the precise distance Dist(0,0) will be longer than the rounded distance D(0,0) due to the round-down operation. That is to say, in the second quadrant (II), a difference between the precise and rounded distances Dist(i,j), D(i,j) will be in the range of $-1 \leq Err(i,j) \leq 0$. It is noted that only a relevant portion of the circle is shown in FIG. 4.

Figure 5:
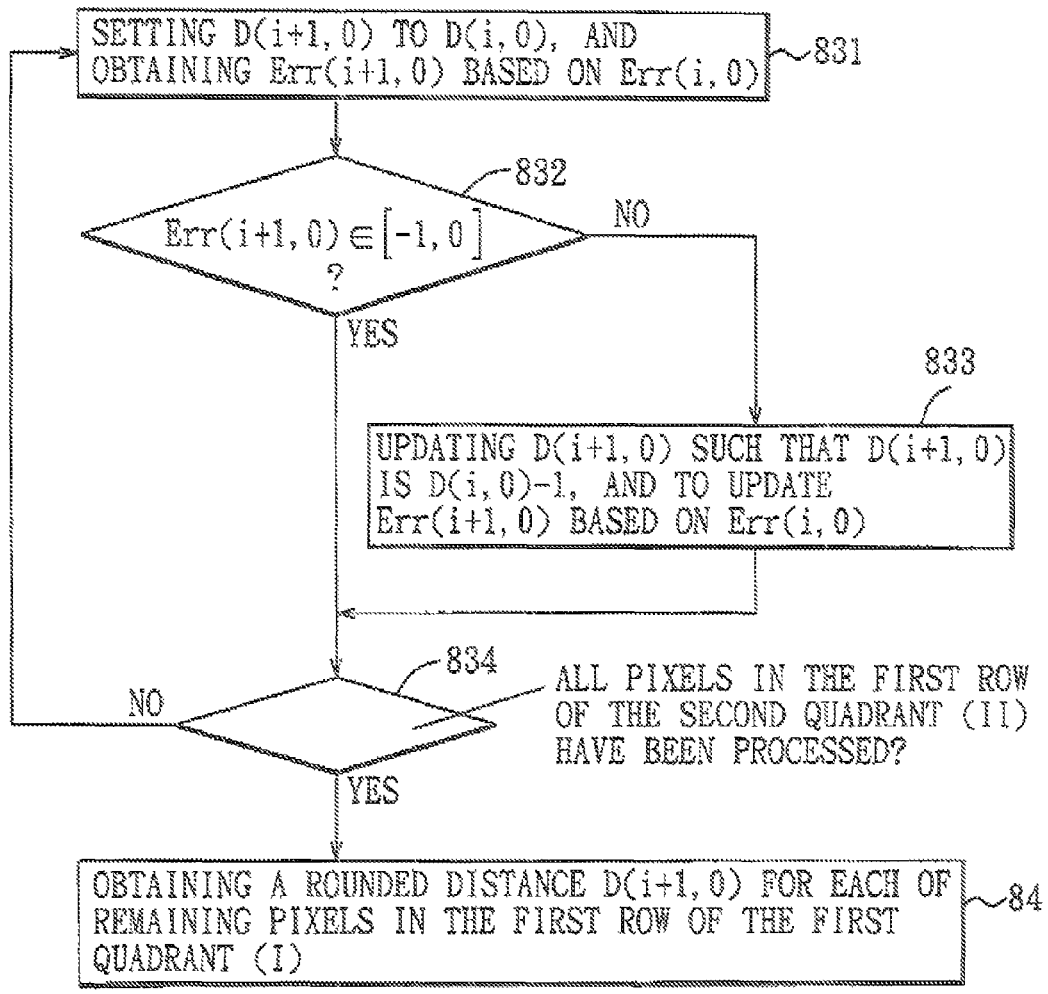
FIG. 5 is a flowchart to illustrate sub-steps of step 83 of the lens correcting method.

In step 83, the first distance estimator 13 is configured to obtain a rounded distance D(i+1,0) for each of remaining pixels in the second quadrant (II) (i.e., $0 \leq i < x0$) through performing round-down operations. As shown in FIG. 2, the first distance estimator 13 includes a first error acquisition unit 131, a first error-range unit 132, and a first distance-update unit 133. Referring to FIG. 5, step 83 includes sub-steps 831 to 834.

In sub-step 831, the first error acquisition unit 131 is configured to set D(i+1,0) to D(i,0), and to obtain Err(i+1,0) based on Err(i,0). Referring to Equation 3:

$$\begin{aligned} Err(i+1, 0) &= D(i+1, 0)^2 - Dist(i+1, 0)^2 \\ &= D(i, 0)^2 - [(i+1-x0)^2 + (0-y0)^2] \\ &= Err(i, 0) + 2(x0 - i) - 1 \end{aligned} \quad \text{(Equation 3)}$$

In sub-step 832, the first error-range unit 132 is configured to determine whether Err(i+1,0) falls within a specified range, such as between −1 and 0, to confirm that D(i+1,0)=D(i,0) and proceed to sub-step 834 if affirmative, and to proceed to sub-step 833 if otherwise.

It can be understood from Equation 3 that, for the pixel P(i+1,0) in the second quadrant (II), Err(i+1,0) will be greater than Err(i,0), which ranges between −1 and 0. Moreover, with further reference to FIG. 4, P(i+1,0) falls outside the circle if Err(i+1,0) is not greater than zero, coincides with the circle if Err(i+1,0) is zero, and falls within the circle if Err(i+1,0) is greater than zero.

In sub-step 833, the first distance-update unit 133 is configured to update D(i+1,0) such that D(i+1,0) is D(i,0)−1, and to update Err(i+1,0) based on Err(i,0). In this case, the reference error Err(i+1,0) may be obtained through Equation 4:

$$\begin{aligned} Err(i+1, 0) &= D(i+1, 0)^2 - Dist(i+1, 0)^2 \\ &= [D(i, 0) - 1]^2 - [(i+1-x0)^2 + (0-y0)^2] \\ &= Err(i, 0) - 2 \times D(i, 0) + 2(x0 - i) \end{aligned} \quad \text{(Equation 4)}$$

Figure 6:
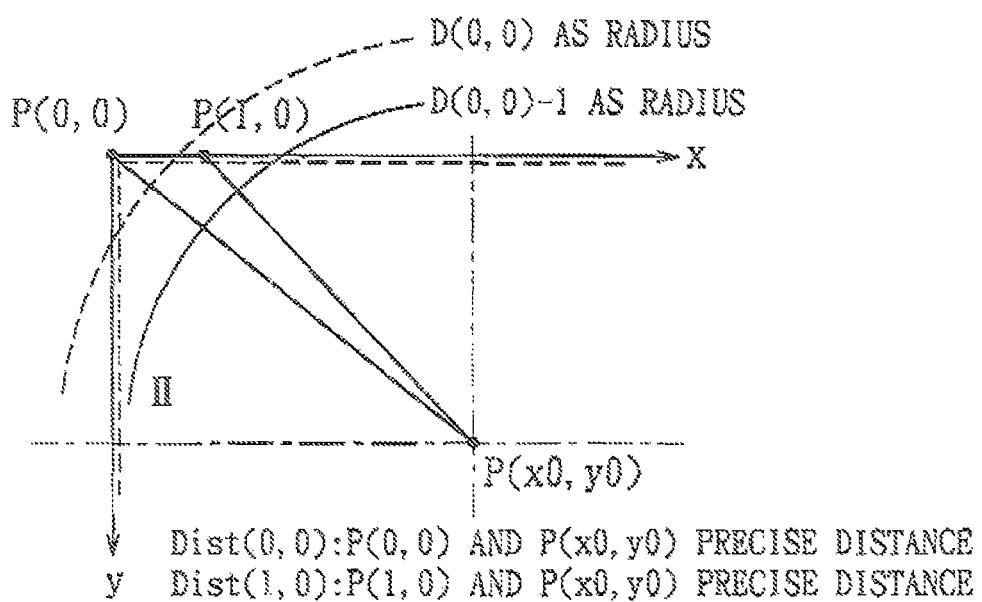
FIG. 6 is a schematic diagram to illustrate two adjacent pixels in the second quadrant falling inside and outside the circle centered at the center of the image, respectively.

Referring to FIG. 6, in comparison with the value of D(i+1,0) set by the first error acquisition unit 131, the value of D(i+1,0) set by the first distance-update unit 133 is smaller than that set by the first error acquisition unit 131 by one. This is because, in the second quadrant (II), P(i+1,0) is closer to P(x0,y0) relative to P(i,0), such that D(i+1,0) is not greater than D(i,0). In addition, P(x0,y0), P(i,0), and P(i+1,0) may serve as the vertices of a triangle, which conforms to the trigonometric theorem of "the sum of any two sides of a triangle is longer than the remaining side of the same". Therefore, the difference between Dist(i+1,0) and Dist(i,0) must be less than one.

In sub-step 834, the first distance estimator 13 is configured to proceed back to sub-step 831 to acquire D(i+2,0) and Err(i+2,0) for P(i+2,0) based on D(i+1,0) and Err(i+1,0) thus acquired. The first distance estimator 13 will repeatedly proceed back to sub-step 831 from sub-step 834 until all pixels in the first row of the second quadrant (II) have been processed.

Next, the distance estimating unit 10 is further configured to obtain rounded distances for pixels in the other quadrants (I, III, IV), the processes of which, however, are different to that of obtaining rounded distances for pixels in the second quadrant (II). For example, if P(i,0) and P(i+1,0) are in the first quadrant (I), P(i+1,0) is farther from the basis pixel than P(i,0). If both P(i,0) and P(i+1,0) have rounded distances D(i,0), D(i+1,0) that are obtained through round-down operations, Err(i+1,0) will be greater than Err(i,0) and an absolute value of a difference between D(i,0), D(i+1,0) may be greater than one.

Therefore, when processing pixels in the first row of the first quadrant (I), the second distance estimator 14 is configured to perform round-up operations upon some of the pixels based on the rounded distances thereof, such that a difference between the rounded distance of any pixel and that of an adjacent pixel may not exceed one.

Shown in Table 1 is a plurality of relationships each associating a corresponding one of the quadrants (I-IV) with operations performed upon some of the pixels in the corresponding one of the quadrants (I-IV) along the x-axis and the y-axis.

TABLE 1

| Quadrant | Along x-axis D(i + 1, j) | | Along y-axis D(i, j + 1) | |
|---|---|---|---|---|
| First (I) | Round-up | D(i, j) or D(i, j) + 1 | Round-down | D(i, j) or D(i, j) − 1 |
| Second (II) | Round-down | D(i, j) or D(i, j) − 1 | Round-down | D(i, j) or D(i, j) − 1 |
| Third (III) | Round-down | D(i, j) or D(i, j) − 1 | Round-up | D(i, j) or D(i, j) + 1 |
| Fourth (IV) | Round-up | D(i, j) or D(i, j) + 1 | Round-up | D(i, j) or D(i, j) + 1 |

In step 84, the second distance estimator 14 is configured to set the rounded distance D(x0,0) and the reference error Err(x0,0) of P(x0,0) to "y0" and zero, respectively, and to subsequently set a rounded distance D(i+1,0) for each of remaining pixels in the first row of the first quadrant (I) (i.e., $x0 \leq i <$ width of the captured image−1) through performing round-up operations.

Figure 7:
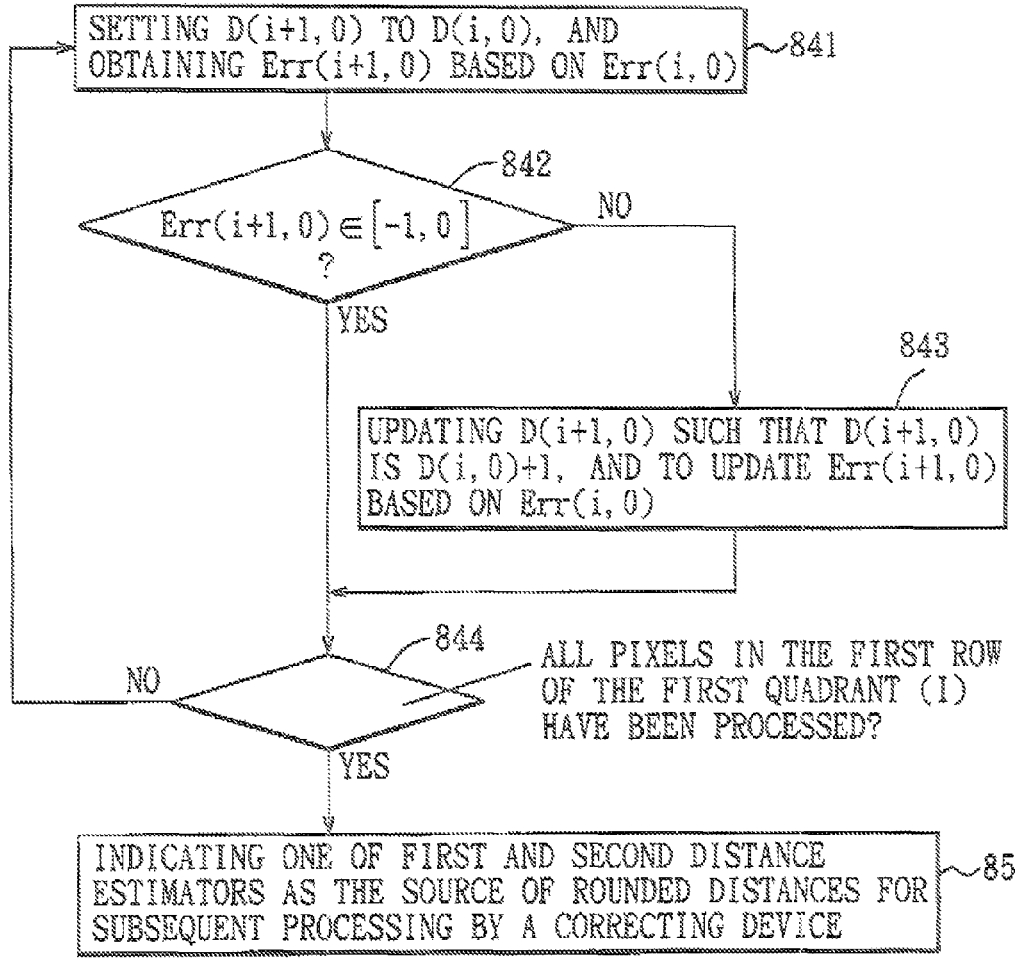
FIG. 7 is a flowchart to illustrate sub-steps of step 84 of the lens correcting method.

As shown in FIG. 2, the second distance estimator 14 includes a second error acquisition unit 141, a second error-range unit 142, ands second distance-update unit 143. Referring to FIG. 7, step 84 includes sub-steps 841 to 844.

In sub-step 841, the second error acquisition unit 141 is configured to set the rounded distance D(i+1,0) of P(i+1,0) to D(i,0), and to obtain Err(i+1,0) based on Equation 3.

In sub-step 842, the second error-range unit 142 is configured to determine whether the reference error Err(i+1,0) falls within a specified range, such as between 0 and 1, to confirm that D(i+1,0)=D(i,0) and proceed to sub-step 844 if affirmative, and to proceed to sub-step 843 if otherwise.

Figure 8:
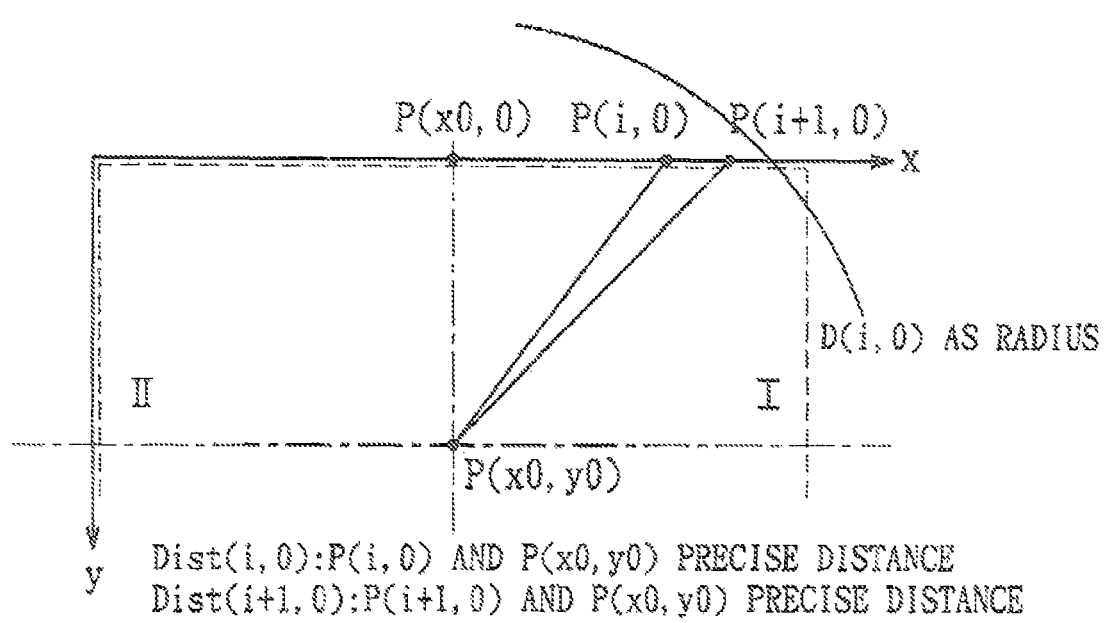
FIG. 8 is a schematic diagram to illustrate two adjacent pixels in a first quadrant falling inside a circle centered at the center of the image.

Referring to FIG. 8, if D(i,0) serves as the radius of a circle centered on the basis pixel, P(i,0) will fall within the circle, and Err(i,0) will be not smaller than zero and not greater than one. Furthermore, since P(i+1,0) is farther from the basis pixel than P(i,0), Err(i+1,0) is smaller than Err(i,0). Moreover, P(i+1,0) falls inside the circle if Err(i+1,0) is greater than zero, coincides with the circle if Err(i+1,0) is equal to zero, and falls outside the circle if Err(i+1,0) is smaller than zero.

In sub-step 843, the second distance-update unit 143 is configured to update the rounded distance D(i+1,0) such that the rounded distance D(i+1,0) is D(i,0)+1, and to update Err(i+1,0) based on Equation 7 with reference to Err(i,0).

$$Err(i+1, 0) = D(i+1, 0)^2 - Dist(i+1, 0)^2 \quad \text{(Equation 7)}$$
$$= [D(i, 0) + 1]^2 - [(i + 1 - x0)^2 + (0 - y0)^2]$$
$$= Err(i, 0) + 2 \times D(i, 0) + 2(x0 - i)$$

Figure 9:
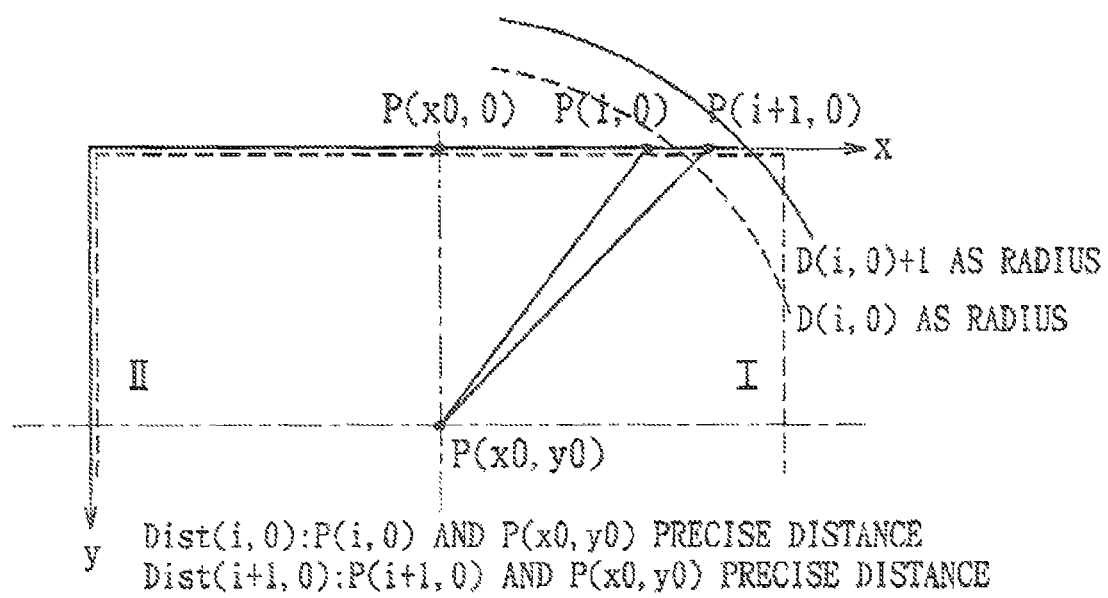
FIG. 9 is a schematic diagram to illustrate two adjacent pixels in the first quadrant falling inside and outside the circle centered at the center of the image, respectively.

Referring to FIG. 9, P(i+1,0) falls within a circle having the updated rounded distance D(i+1,0) as its radius. Moreover, Err(i+1,0) is not smaller than zero and not greater than one.

In sub-step 844, the second distance estimator 14 is configured to proceed back to sub-step 841 to acquire a rounded distance D(i+2,0) and a reference error Err(i+2,0) for P(i+2,0) based on the rounded distance D(i+1,0) and the reference error Err(i+1,0) thus acquired. The second distance estimator 14 will repeatedly proceed back to sub-step 841 from sub-step 844 until all pixels in the first row of the first quadrant (I) have been processed.

The distance estimating unit 10 further includes a source-selecting unit 16 (such as a multiplexer) configured to perform step 85 of the lens correcting method, in which, based on a source indicator that indicates the quadrant for which the rounded distances are obtained, one of the first and second distance estimators 13, 14 is selected as the source of the rounded distances for subsequent processing by the correcting device 3. The source indicator may be obtained from a lookup table that records the relationships contained in Table 1.

Distance acquisition by the distance acquisition device 1 has hereinabove been described with reference to the first row of the first and second quadrants (I, II), which should provide enough information for a skilled artisan to readily appreciate steps required for acquiring rounded distances for remaining pixels of the captured image according to the present invention. Accordingly, such required steps will not be described hereinafter for the sake of brevity.

After all pixels of the captured image have been processed by the distance acquisition device 1, the correcting device 3 is configured to perform brightness adjustment upon pixels of the captured image based on a result of matching between the rounded distance obtained for the pixel and the relationships stored in the table-lookup unit 2 so as to achieve an effect of uniform brightness for the captured image.

Figure 10:
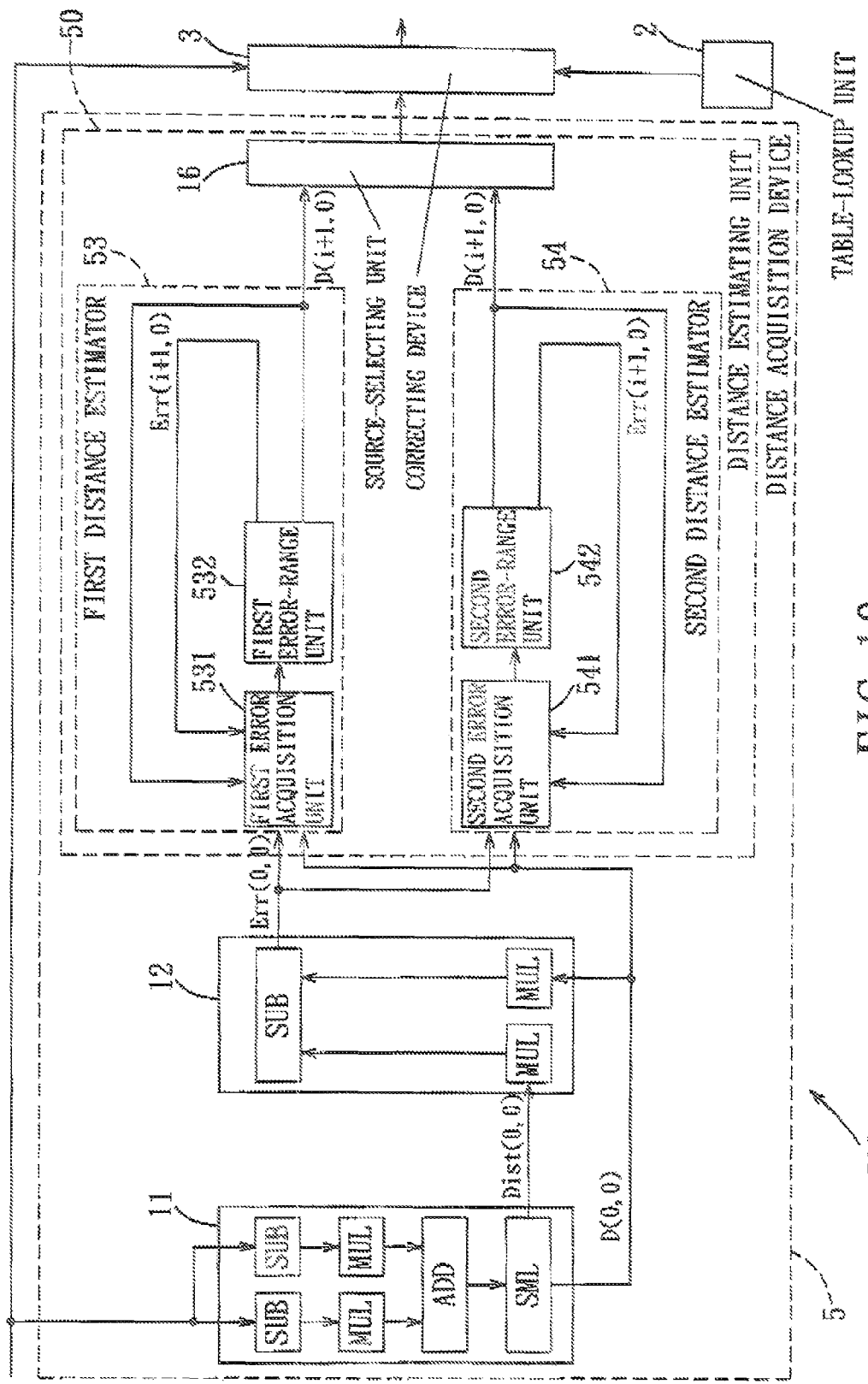
FIG. 10 is a block diagram to illustrate the second preferred embodiment of a lens correcting system according to the present invention.

Referring to FIG. 10, the distance acquisition device 5 of the second preferred embodiment of a lens correcting system 500 according to the present includes first and second distance estimators 53, 54 that are different from the first and second distance estimators 13, 14 of the first preferred embodiment.

In the second preferred embodiment, the first distance estimator 53 includes a first error acquisition unit 531 that is configured to acquire a candidate reference error with D(i+1, 0) being set to D(i,0), and another candidate reference error with D(i+1,0) being set to D(i,0)−1. Next, the first distance estimator 53 further includes a first error-range unit 532 configured to set the rounded distance D(i+1,0) for P(i+1,0) based on one of the candidate reference errors acquired by the first error acquisition unit 531 that is smaller in magnitude. The rounded distance set by the first error-range unit 532 is sent to the first error acquisition unit 531 for acquiring candidate reference errors of a next pixel.

The difference between the first and second distance estimators 53, 54 resides in that the second distance estimator 54 includes a second error acquisition unit 541 configured to acquire a candidate reference error with D(i+1,0) being set to D(i,0), and another candidate reference error with D(i+1,0) being set to D(i,0)+1.

Specifically, in the first row of the second quadrant (II), D(i,0) may serve as the radius of one circle, and D(i,0)−1 may serve as the radius of another circle. For each pixel in the first row of the second quadrant (II), the distance acquisition device 5 is configured to set D(i+1,0) to the radius of one of the two circles that is closer to the pixel.

On the other hand, in the first row of the first quadrant (I), D(i,0) may serve as the radius of one circle, and D(i,0)+1 may serve as the radius of another circle. For each pixel in the first row of the first quadrant (I), the distance acquisition device 5 is configured to set D(i+1,0) to the radius of one of the two circles that is closer to the pixel.

It is worth noting that the error acquisition units 131, 141, 531, 541, the error-range units 132, 142, 532, 542, the distance update units 133, 143, and other components may be shared resources, as long as the condition of no conflict in timing sequence is satisfied.

Since the captured image is captured through a non-planar lens, pixels that are farther from the center of the captured image have lower brightness relative to those closer to the center. To improve uniformity of distribution of brightness of the captured image, brightness adjustment performed upon pixels of the captured image by the correcting device 3 is based on the correcting factor to which the rounded distance of the pixel corresponds. In the preferred embodiment, the correcting factors are in a positive relation to the rounded distances. However, in other embodiment, where a different lens is used, the correcting factors may be configured based on optical characteristics of the lens.

Furthermore, in other embodiments, the distance acquisition device 1, 5 may be configured to acquire the rounded distance and the reference error of an arbitrary pixel upon which processing of remaining pixels of the captured image is based. That is to say, the distance acquisition device 1, 5 of the other embodiments may start processing from any pixel instead of P(0,0), and proceed to any one of adjacent pixels (e.g., P(i+1,j), P(i−1,j), P(i,j+1), or P(i,j−1)).

In addition, the distance acquisition device 1, 5 may be implemented as a standalone device separate from the lens correcting system 100, 500.

In summary, the distance acquisition device 1, 5 is able to acquire a rounded distance and a reference error for an arbitrary pixel of a captured image, and to obtain a rounded distance and a reference error for each of remaining pixels based on the rounded distance and the reference error of the arbitrary pixel. Further, the correcting device 3 is able to adjust brightness of pixels of a captured image based on a result of matching between the rounded distances obtained therefor and the relationships stored in the table-lookup unit 2 such that brightness distribution of the captured image is relatively uniform.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A distance acquisition device comprising:
 a reference distance acquisition unit configured to acquire a precise distance from a reference point to a basis point, the reference distance acquisition unit further being configured to perform a rounding operation upon the precise distance so as to obtain a first rounded distance, the rounding operation being one selected from the group consisting of round-up and round-down;

a reference error acquisition unit configured to obtain a first reference error corresponding to a difference between the precise distance and the first rounded distance; and a distance estimating unit configured to obtain a second rounded distance based on the first rounded distance and the first reference error, the second rounded distance representing a distance from an adjacent point to the basis point, the adjacent point being a point adjacent to the reference point;

wherein the reference point, the basis point, and the adjacent point are disposed on a plane, the plane having quadrants that are defined with reference to the basis point; and wherein the reference point resides within one of the quadrants, the rounding operation of the reference distance acquisition unit being dependent on the quadrant in which the reference point resides.

2. The distance acquisition device as claimed in claim 1, wherein said distance estimating unit includes:

a first distance estimator configured to set the second rounded distance to one of the first rounded distance and a result of the first rounded distance subtracted by a predetermined value;

a second distance estimator configured to set the second rounded distance to one of the first rounded distance and a result of the first rounded distance added by the predetermined value; and a source-selecting unit configured to, based on a source indicator, select one of the first and second distance estimators for outputting the second rounded distance obtained thereby.

3. The distance acquisition device as claimed in claim 2, wherein:

said first distance estimator is further configured to obtain a reference error that corresponds to the second rounded distance being set to the first rounded distance, and another reference error that corresponds to the second rounded distance being set to the result of the first rounded distance subtracted by the predetermined value, to determine whether the reference errors obtained thereby fall within a predetermined range, and to set the second rounded distance accordingly; and said second distance estimator is further configured to obtain a reference error that corresponds to the second rounded distance being set to the first rounded distance, and another reference error that corresponds to the second rounded distance being set to the result of the first rounded distance added by the predetermined value, to determine whether the reference errors obtained thereby fall within a predetermined range, and to set the second rounded distance accordingly.

4. The distance acquisition device as claimed in claim 3, wherein each of the first and second distance estimators is further configured to set a rounded distance and obtain a reference error for a point that is adjacent to the adjacent point based on the second rounded distance and the reference error obtained for the adjacent point.

5. The distance acquisition device as claimed in claim 2, wherein:

said first distance estimator is further configured to obtain a reference error that corresponds to the second rounded distance being set to the first rounded distance, and another reference error that corresponds to the second rounded distance being set to the result of the first rounded distance subtracted by the predetermined value, to set the second rounded distance to the first rounded distance when an absolute value of the reference error that corresponds to the second rounded distance being set to the first rounded distance is smaller than an absolute value of the reference error that corresponds to the second rounded distance being set to the result of the first rounded distance subtracted by the predetermined value, and to set the second rounded distance to the result of the first rounded distance subtracted by the predetermined value when otherwise; and said second distance estimator is further configured to obtain a reference error that corresponds to the second rounded distance being set to the first rounded distance, and another reference error that corresponds to the second rounded distance being set to the result of the first rounded distance added by the predetermined value, to set the second rounded distance to the first rounded distance when an absolute value of the reference error that corresponds to the second rounded distance being set to the first rounded distance is smaller than an absolute value of the reference error that corresponds to the second rounded distance being set to the result of the first rounded distance added by the predetermined value, and to set the second rounded distance to the result of the first rounded distance added by the predetermined value when otherwise.

6. The distance acquisition device as claimed in claim 5, wherein each of the first and second distance estimators is further configured to set a rounded distance and obtain a reference error for a point that is adjacent to the adjacent point based on the second rounded distance and the reference error obtained for the adjacent point.

7. The distance acquisition device as claimed in claim 2, wherein the source indicator corresponds to a relative position of the adjacent point relative to the basis point.

8. The distance acquisition device as claimed in claim 1, wherein said reference distance acquisition unit is configured to perform rounding upon the precise distance such that:

a round-up operation is performed when the reference point resides in a first quadrant and the adjacent point is located horizontally-adjacent to the reference point;

a round-down operation is performed when the reference point resides in the first quadrant and the adjacent point is located vertically-adjacent to the reference point;

a round-down operation is performed when the reference point resides in a second quadrant and the adjacent point is located horizontally-adjacent to the reference point;

a round-down operation is performed when the reference point resides in the second quadrant and the adjacent point is located vertically-adjacent to the reference point;

a round-down operation is performed when the reference point resides in a third quadrant and the adjacent point is located horizontally-adjacent to the reference point;

a round-up operation is performed when the reference point resides in the third quadrant and the adjacent point is located vertically-adjacent to the reference point;

a round-up operation is performed when the reference point resides in a fourth quadrant and the adjacent point is located horizontally-adjacent to the reference point; and a round-up operation is performed when the reference point resides in the fourth quadrant and the adjacent point is located vertically-adjacent to the reference point.

9. A lens correcting system adapted to receive a captured image captured through a lens, the captured image including a plurality of pixels, the lens correcting system comprising:
- a distance acquisition device including:
  - a reference distance acquisition unit configured to acquire a precise distance from a reference pixel of the captured image to a basis pixel of the captured image, the reference distance acquisition unit further configured to perform a rounding operation upon the precise distance so as to obtain a first rounded distance, the rounding operation being one selected from the group consisting of round-up and round-down,
  - a reference error acquisition unit configured to obtain a first reference error corresponding to a difference between the precise distance and the first rounded distance, and
  - a distance estimating unit configured to obtain a second rounded distance based on the first rounded distance and the first reference error, the second rounded distance representing a distance from an adjacent pixel to the basis pixel, the adjacent pixel being a pixel adjacent to the reference pixel; and
- a correcting device configured to perform adjustment upon the reference pixel and the adjacent pixel based on correcting factors that correspond to the first and second rounded distances acquired by said distance acquisition device;
- wherein the captured image comprises quadrants, each quadrant being defined with reference to the basis pixel; and
- wherein the reference pixel resides within one of the quadrants, the rounding operation of the reference distance acquisition unit being dependent on the quadrant in which the reference pixel resides.

10. The lens correcting system as claimed in claim 9, wherein said distance estimating unit includes:
- a first distance estimator configured to set the second rounded distance to one of the first rounded distance and a result of the first rounded distance subtracted by a predetermined value;
- a second distance estimator configured to set the second rounded distance to one of the first rounded distance and a result of the first rounded distance added by the predetermined value; and
- a source-selecting unit configured to, based on a source indicator, select one of the first and second distance estimators for outputting the second rounded distance obtained thereby.

11. The lens correcting system as claimed in claim 10, wherein:
- said first distance estimator is further configured to obtain a reference error that corresponds to the second rounded distance being set to the first rounded distance, and another reference error that corresponds to the second rounded distance being set to the result of the first rounded distance subtracted by the predetermined value, to determine whether the reference errors obtained thereby fall within a predetermined range, and to set the second rounded distance accordingly; and
- said second distance estimator is further configured to obtain a reference error that corresponds to the second rounded distance being set to the first rounded distance, and another reference error that corresponds to the second rounded distance being set to the result of the first rounded distance added by the predetermined value, to determine whether the reference errors obtained thereby fall within a predetermined range, and to set the second rounded distance accordingly.

12. The lens correcting system as claimed in claim 11, wherein each of the first and second distance estimators is further configured to set a rounded distance and obtain a reference error for a pixel that is adjacent to the adjacent pixel based on the second rounded distance and the reference error obtained for the adjacent pixel.

13. The lens correcting system as claimed in claim 10, wherein:
- said first distance estimator is further configured to obtain a reference error that corresponds to the second rounded distance being set to the first rounded distance, and another reference error that corresponds to the second rounded distance being set to the result of the first rounded distance subtracted by the predetermined value, to set the second rounded distance to the first rounded distance when an absolute value of the reference error that corresponds to the second rounded distance being set to the first rounded distance is smaller than an absolute value of the reference error that corresponds to the second rounded distance being set to the result of the first rounded distance subtracted by the predetermined value, and to set the second rounded distance to the result of the first rounded distance subtracted by the predetermined value when otherwise; and
- said second distance estimator is further configured to obtain a reference error that corresponds to the second rounded distance being set to the first rounded distance, and another reference error that corresponds to the second rounded distance being set to the result of the first rounded distance added by the predetermined value, to set the second rounded distance to the first rounded distance when an absolute value of the reference error that corresponds to the second rounded distance being set to the first rounded distance is smaller than an absolute value of the reference error that corresponds to the second rounded distance being set to the result of the first rounded distance added by the predetermined value, and to set the second rounded distance to the result of the first rounded distance added by the predetermined value when otherwise.

14. A lens correcting method comprising:
- (a) receiving a captured image captured through a lens, the captured image including a plurality of pixels;
- (b) acquiring a precise distance from a reference pixel to a basis pixel, and performing a rounding operation upon the precise distance so as to obtain a first rounded distance, the rounding operation being one selected from the group consisting of round-up and round-down;
- (c) obtaining a first reference error corresponding to a difference between the precise distance and the first rounded distance;
- (d) obtaining a second rounded distance based on the first rounded distance and the first reference error, the second rounded distance representing a distance from an adjacent pixel to the basis pixel, the adjacent pixel being a pixel adjacent to the reference pixel; and
- (e) performing adjustment upon the reference pixel and the adjacent pixel based on correcting factors that correspond to the first rounded distance and the second rounded distance;
- wherein the captured image comprises quadrants, the quadrants being defined with reference to the basis pixel; and wherein the reference pixel resides in one of the quadrants, the rounding operation being dependent on the quadrant in which the reference pixel resides.

15. The lens correcting method as claimed in claim 14, wherein step (d) includes:
   (d1) configuring a first distance estimator to set the second rounded distance to one of the first rounded distance and a result of the first rounded distance subtracted by a predetermined value;
   (d2) configuring a second distance estimator to set the second rounded distance to one of the first rounded distance and a result of the first rounded distance added by the predetermined value; and
   (d3) based on a source indicator, selecting one of the first and second distance estimators for outputting the second rounded distance obtained thereby.

16. The lens correcting method as claimed in claim 15, wherein:
   in step (d1), the first distance estimator is further configured to obtain a reference error that corresponds to the second rounded distance being set to the first rounded distance, and another reference error that corresponds to the second rounded distance being set to the result of the first rounded distance subtracted, by the predetermined value, to determine whether the reference errors obtained thereby fall within a predetermined range, and to set the second rounded distance accordingly; and
   in step (d2), the second distance estimator is further configured to obtain a reference error that corresponds to the second rounded distance being set to the first rounded distance, and another reference error that corresponds to the second rounded distance being set to the result of the first rounded distance added by the predetermined value, to determine whether the reference errors obtained thereby fall within a predetermined range, and to set the second rounded distance accordingly.

17. The lens correcting method as claimed in claim 16, wherein each of the first and second distance estimators is further configured to set a rounded distance and obtain a reference error for a pixel that is adjacent to the adjacent pixel based on the second rounded distance and the reference error obtained for the adjacent pixel.

18. The lens correcting method as claimed in claim 15, wherein:
   in step (d1), the first distance estimator is further configured to obtain a reference error that corresponds to the second rounded distance being set to the first rounded distance, and another reference error that corresponds to the second rounded distance being set to the result of the first rounded distance subtracted by the predetermined value, to set the second rounded distance to the first rounded distance when an absolute value of the reference error that corresponds to the second rounded distance being set to the first rounded distance is smaller than an absolute value of the reference error that corresponds to the second rounded distance being set to the result of the first rounded distance subtracted by the predetermined value, and to set the second rounded distance to the result of the first rounded distance subtracted by the predetermined value when otherwise; and
   in step (d2), the second distance estimator is further configured to obtain a reference error that corresponds to the second rounded distance being set to the first rounded distance, and another reference error that corresponds to the second rounded distance being set to the result of the first rounded distance added by the predetermined value, to set the second rounded distance to the first rounded distance when an absolute value of the reference error that corresponds to the second rounded distance being set to the first rounded distance is smaller than an absolute value of the reference error that corresponds to the second rounded distance being set to the result of the first rounded distance added by the predetermined value, and to set the second rounded distance to the result of the first rounded distance added by the predetermined value when otherwise.

19. The lens correcting method as claimed in claim 18, wherein each of the first and second distance estimators is further configured to set a rounded distance and obtain a reference error for a pixel that is adjacent to the adjacent pixel based on the second rounded distance and the reference error obtained for the adjacent pixel.

20. The lens correcting method as claimed in claim 15, wherein the source indicator corresponds to a relative position of the adjacent pixel relative to the basis pixel.

21. The lens correcting method as claimed in claim 14, wherein, in step (b), rounding upon the precise distance is performed so as to obtain the first rounded distance, such that:
   a round-up operation is performed when the reference pixel resides in a first quadrant and the adjacent pixel is located horizontally-adjacent to the reference pixel;
   a round-down operation is performed when the reference pixel resides in the first quadrant and the adjacent pixel is located vertically-adjacent to the reference pixel;
   a round-down operation is performed when the reference pixel resides in a second quadrant and the adjacent pixel is located horizontally-adjacent to the reference pixel;
   a round-down operation is performed when the reference pixel resides in the second quadrant and the adjacent pixel is located vertically-adjacent to the reference pixel;
   a round-down operation is performed when the reference pixel resides in a third quadrant and the adjacent pixel is located horizontally-adjacent to the reference pixel;
   a round-up operation is performed when the reference pixel resides in the third quadrant and the adjacent pixel is located vertically-adjacent to the reference pixel;
   a round-up operation is performed when the reference pixel resides in a fourth quadrant and the adjacent pixel is located horizontally-adjacent to the reference pixel; and
   a round-up operation is performed when the reference pixel resides in the fourth quadrant and the adjacent pixel is located vertically-adjacent to the reference pixel.

* * * * *